US011728894B2

(12) United States Patent
Kalman et al.

(10) Patent No.: US 11,728,894 B2
(45) Date of Patent: Aug. 15, 2023

(54) OPTICALLY-ENHANCED MULTICHIP PACKAGING

(71) Applicant: AVICENATECH CORP., Mountain View, CA (US)

(72) Inventors: Robert Kalman, Mountain View, CA (US); Bardia Pezeshki, Mountain View, CA (US); Alexander Tselikov, Mountain View, CA (US); Cameron Danesh, Mountain View, CA (US)

(73) Assignee: AVICENATECH CORP., Sunnyvale, CA (US)

( * ) Notice: Subject to any disclaimer, the term of this patent is extended or adjusted under 35 U.S.C. 154(b) by 0 days.

(21) Appl. No.: 17/229,652

(22) Filed: Apr. 13, 2021

(65) Prior Publication Data

US 2021/0320718 A1    Oct. 14, 2021

Related U.S. Application Data

(60) Provisional application No. 63/009,161, filed on Apr. 13, 2020.

(51) Int. Cl.
*H04B 10/00* (2013.01)
*H04B 10/40* (2013.01)
*G02B 6/43* (2006.01)
*G02B 6/42* (2006.01)
*H04B 10/50* (2013.01)

(52) U.S. Cl.
CPC .......... *H04B 10/40* (2013.01); *G02B 6/4246* (2013.01); *G02B 6/43* (2013.01); *H04B 10/502* (2013.01)

(58) Field of Classification Search
CPC .... H04B 10/40; H04B 10/502; G02B 6/4246; G02B 6/43
See application file for complete search history.

(56) References Cited

U.S. PATENT DOCUMENTS

| 5,335,361 | A | 8/1994 | Ghaem |
| 5,638,469 | A | 6/1997 | Feldman et al. |
| 5,848,214 | A | 12/1998 | Haas et al. |
| 6,160,943 | A | 12/2000 | Davis |
| 6,434,308 | B1* | 8/2002 | Trezza ................ G02B 6/4249 |
| | | | 385/115 |
| 6,780,661 | B1 | 8/2004 | Liu |

(Continued)

FOREIGN PATENT DOCUMENTS

JP    2011-014932 A    1/2011

OTHER PUBLICATIONS

Yurii Vlasov, Silicon photonics for next generation computing systems, Tutorial given at the European Conference on Optical Communications, Sep. 22, 2008.

(Continued)

*Primary Examiner* — Pranesh K Barua
(74) *Attorney, Agent, or Firm* — KOS IP Law LLP

(57) ABSTRACT

Optical chip-to-chip interconnects may use microLEDs as light sources. The interconnected chips may be on a same substrate. A pair of endpoint chips may each have associated optical transceiver subsystems, with transceiver circuitry in transceiver chips. Optical communications may be provided between the optical transceiver subsystems, with the optical transceiver subsystems in communication with their associated endpoint chips by way of metal layers in the substrate.

15 Claims, 9 Drawing Sheets

(56) References Cited

U.S. PATENT DOCUMENTS

| | | | |
|---|---|---|---|
| 7,459,726 | B2 | 12/2008 | Kato et al. |
| 7,539,366 | B1* | 5/2009 | Baks ............... H05K 1/0274 385/33 |
| 7,915,699 | B2 | 3/2011 | Krishnamoorthy et al. |
| 8,148,202 | B2 | 4/2012 | Krishnamoorthy et al. |
| 11,054,593 | B1 | 7/2021 | Chua |
| 2002/0018628 | A1 | 2/2002 | Kim et al. |
| 2004/0126053 | A1* | 7/2004 | Ouchi ............... G02B 6/12004 385/14 |
| 2004/0159777 | A1* | 8/2004 | Stone ............... G02B 6/4246 250/216 |
| 2005/0169591 | A1* | 8/2005 | Broeng ............... G02B 6/1225 385/129 |
| 2012/0251045 | A1* | 10/2012 | Budd ............... G02B 6/425 359/663 |
| 2013/0111744 | A1 | 5/2013 | Tischler et al. |
| 2013/0230280 | A1 | 9/2013 | Kadar-Kallen |
| 2015/0333831 | A1 | 11/2015 | Lai et al. |
| 2015/0341119 | A1* | 11/2015 | Fincato ............... H05K 3/30 398/139 |
| 2016/0020353 | A1 | 1/2016 | Chu |
| 2016/0170120 | A1 | 6/2016 | Shani et al. |
| 2016/0172020 | A1 | 6/2016 | Baker et al. |
| 2016/0233269 | A1 | 8/2016 | Choi et al. |
| 2017/0276874 | A1 | 9/2017 | Kashyap et al. |
| 2018/0239096 | A1 | 8/2018 | Houbertz et al. |
| 2018/0269191 | A1 | 9/2018 | England et al. |
| 2019/0011652 | A1 | 1/2019 | Chang |
| 2019/0049367 | A1 | 2/2019 | Zou |
| 2019/0066571 | A1 | 2/2019 | Goward |
| 2019/0189603 | A1 | 6/2019 | Wang et al. |
| 2019/0287908 | A1 | 9/2019 | Dogiamis et al. |
| 2020/0111771 | A1 | 4/2020 | Su et al. |

OTHER PUBLICATIONS

J. F. C. Carreira et al., Direct integration of micro-LEDs and a SPAD detector on a silicon CMOS chip for data communications and time-of-flight ranging, Optics Express, vol. 28, No. 5, Mar. 2, 2020, pp. 6909-6917.

Martin D. Dawson, Micro-LEDs for Technological Convergence between Displays, Optical Communications, & Sensing and Imaging Systems, SID Display Week 2020, Session 44, Invited paper No. 44.1, 27 pages.

Lars Brusberg et al., Optoelectronic Glass Substrate for Co-packaged Optics and ASICs, Optical Fiber Communication Conference, Mar. 12, 2020, San Diego, CA, pp. 1-24.

Roger Dangel et al., Polymer Waveguides Enabling Scalable Low-Loss Adiabatic Optical Coupling for Silicon Photonics, IEEE Journal of Selected Topics in Quantum Electronics, vol. 24, No. 4, Jul./Aug. 2018, 11 pages.

Ziyang Zhang et al., Hybrid Photonic Integration on a Polymer Platform, Photonics 2015, 2, pp. 1005-1026.

David A. B. Miller, Optical Interconnects, IAA Workshop, Jul. 22, 2008, pp. 1-26.

Brian Corbett et al., Chapter Three—Transfer Printing for Silicon Photonics, Semiconductors and Semimetals, vol. 99, 2018, ISSN 0080-8784, pp. 43-70, https://doi.org/10.1016/bs.semsem.2018.08.001.

Bing Wang et al., On-chip Optical Interconnects using InGaN Light-Emitting Diodes Integrated with Si-CMOS, In: Aais Communications and Photonics Conference 2014, Shanghai, China, Nov. 11-14, 2014, pp. 1-3.

Lei Liu et al., On-chip optical interconnect on silicon by transfer printing, In: CLEO: Science and Innovations 2018, San Jose, California, USA, May 13-18, 2018, pp. 1-2.

Lee et al., Low-Cost and Robust 1-Gbit/s Plastic Optical Fiber Link Based on Light-Emitting Diode Technology, in Proc. Opt. Fiber Commun. Conf. Expo./Nat. Fiber Opt. Eng. Conf., 2008.

Yahav et al., Multi-Gigabit Spatial-Division Multiplexing Transmission Over Multicore Plastic Optical Fiber, Journal of Lightwave Technology, vol. 39, No. 8, Apr. 15, 2021, pp. 2296-2304.

International Search Report on related PCT Application No. PCT/US2021/027135 from International Searching Authority (KIPO) dated Jul. 26, 2021.

Written Opinion on related PCT Application No. PCT/US2021/027135 from International Searching Authority (KIPO) dated Jul. 26, 2021.

* cited by examiner

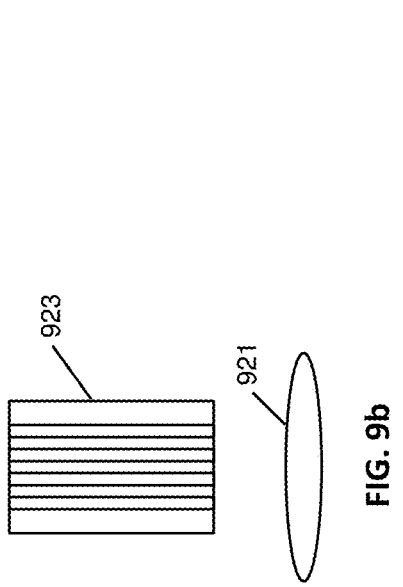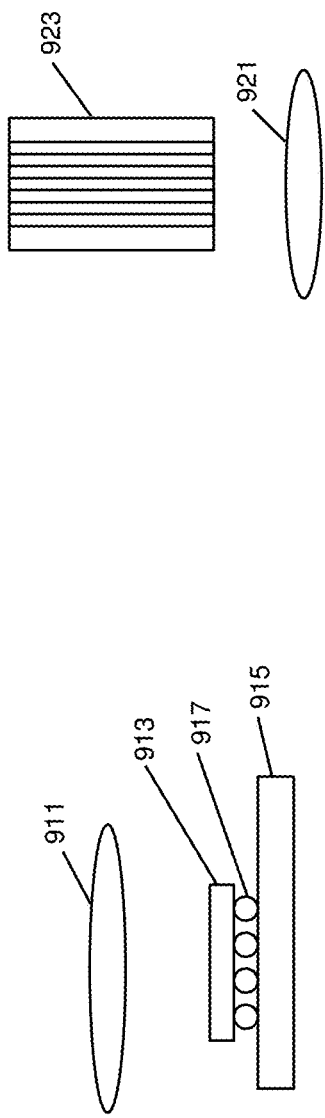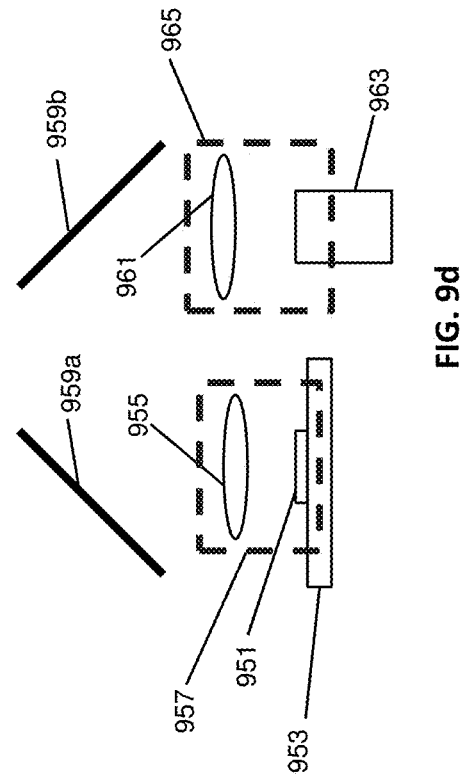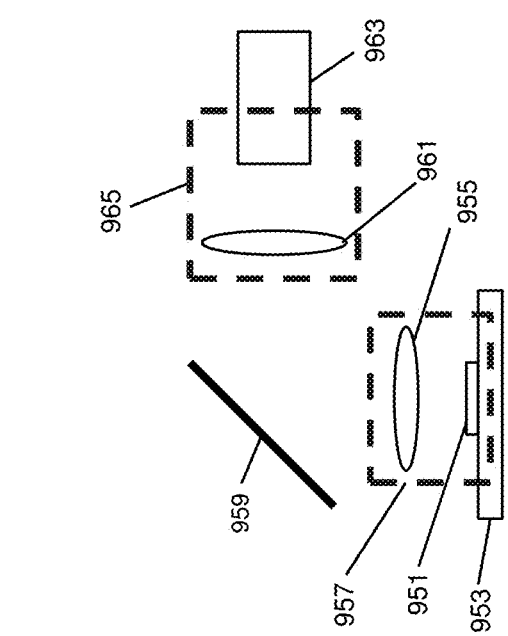

OPTICALLY-ENHANCED MULTICHIP PACKAGING

CROSS REFERENCE TO RELATED APPLICATION

This application claims the benefit of the filing date of U.S. Provisional Patent Application No. 63/009,161, filed on Apr. 13, 2020, the disclosure of which is incorporated by reference herein.

FIELD OF THE INVENTION

The present invention relates generally to optical communication systems, and more generally to optical communications between chips using microLEDs.

BACKGROUND OF THE INVENTION

Computing and networking performance requirements are seemingly ever-increasing. Prominent applications driving these requirements include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs.

However, Moore's Law appears to be reaching its limits as shrinking feature sizes below 10 nm results in decreasing marginal performance benefits with decreased yields and increased per-transistor costs. Beyond these limitations, a single IC can only contain so much functionality, and that functionality is constrained because the IC's process cannot be simultaneously optimized for different functionality, e.g. logic, DRAM, and I/O.

There are significant benefits to "de-integrating" SoCs into smaller "chiplets", including:

The process for each chiplet can be optimized to its function, e.g. logic, DRAM, high-speed I/O, etc.

Chiplets are well-suited to reuse in multiple designs.

Chiplets are less expensive and quicker to develop.

Chiplets have higher yield because they contain fewer devices.

There is, however, a major drawback to chiplets compared to SoCs: use of chiplets generally requires far more chip-to-chip connections. Compared to the on-chip connections between functional blocks in SoCs, chip-to-chip connections are typically much less dense and require far more power (for example normalized as energy per bit).

BRIEF SUMMARY OF THE INVENTION

Some embodiments provide optical chip-to-chip interconnects with microLEDs as light sources. In some embodiments the interconnects have a linear connection density >10 Tbps/mm. In some embodiments the interconnects have an area interconnect density >1 Pbps/cm2. In some embodiments the interconnects have power consumption <100 fJ/bit. In some embodiments the interconnects have an interconnect lengths >10 cm with no additional power dissipation. In some embodiments the interconnects have a latency approaching that limited by the speed of light.

In some embodiments the microLEDs are modulated at rates >1 Gbps. In some embodiments parallel optical links (POLs) include microLEDs as light sources. In some embodiments the parallel optical links provide interconnect networks for high-performance processing and networking applications.

Some embodiments provide optically interconnected integrated circuits, comprising: a substrate; a first integrated circuit (IC) chip, including logic circuitry, mounted to the substrate; a first optical transceiver subsystem mounted to the substrate; a second optical transceiver subsystem mounted to the substrate; a second IC chip, including logic circuitry, mounted to the substrate; the substrate including metal signal layers connecting the first IC chip and the first optical transceiver subsystem, and connecting the second IC chip and the second optical transceiver subsystem; and a plurality of waveguide cores optically connecting the first optical transceiver subsystem and the second optical transceiver subsystem.

In some embodiments the substrate includes metal signal layers connecting the first IC chip and the second IC chip. In some embodiments the substrate does not include metal signal layers connecting the first IC chip and the second IC chip. In some embodiments the substrate is in a package. In some such embodiments the substrate is coupled to the package by solder balls. In some such embodiments the substrate includes first through-substrate vias connecting at least some of the solder balls coupling the substrate and package with the first IC chip. In some such embodiments the substrate includes second through-substrate vias connecting at least some other of the solder balls coupling the substrate and package with the second IC chip.

In some embodiments the first optical transceiver subsystem comprises a first array of microLEDs and photodetectors, first microLED driver circuitry to drive microLEDs, of the first array of microLEDs and photodetectors, to emit light in accordance with information from the first IC chip, and first receiver circuitry to process signals received by photodetectors, of the first array of microLEDs and photodetectors, to provide information to the first IC chip. In some such embodiments the first microLED driver circuitry and the receiver circuitry is in a first transceiver IC chip. In some such embodiments the first microLED driver circuitry comprises a first array of microLED driver circuitry and the first receiver circuitry comprises a first array of receiver circuitry. In some such embodiments the microLEDs, of the first array of microLEDs and photodetectors, are bonded to the first transceiver IC chip. In some such embodiments the photodetectors, of the first array of microLEDs and photodetectors, are monolithically integrated in the first transceiver IC chip. In some such embodiments the first array of microLEDs and photodetectors are arranged in tiles.

In some embodiments the first optical transceiver subsystem comprises a first array of microLEDs and photodetectors, first microLED driver circuitry to drive microLEDs, of the first array of microLEDs and photodetectors, to emit light in accordance with information from the first IC chip, and first receiver circuitry to process signals received by photodetectors, of the first array of microLEDs and photodetectors, to provide information to the first IC chip, and the second optical transceiver subsystem comprises a second array of microLEDs and photodetectors, second microLED driver circuitry to drive microLEDs, of the second array of microLEDs and photodetectors, to emit light in accordance with information from the second IC chip, and second receiver circuitry to process signals received by photodetectors, of the second array of microLEDs and photodetectors, to provide information to the second IC chip. In some such embodiments the first microLED driver circuitry and the receiver circuitry is in a first transceiver IC chip, and the second microLED driver circuitry and the receiver circuitry is in a second transceiver IC chip. In some such embodiments the second microLED driver circuitry comprises a second array of microLED driver circuitry and the second receiver circuitry comprises a second array of receiver circuitry. In some such embodiments the microLEDs, of the second array of microLEDs and photodetectors, are bonded to the second transceiver IC chip. In some such embodiments the photodetectors, of the first second of microLEDs and photodetectors, are monolithically integrated in the second transceiver IC chip. In some such embodiments the second array of microLEDs and photodetectors are arranged in tiles.

In some embodiments wherein the plurality of waveguide cores are part of a multi-layer planar waveguide stack.

In some embodiments the first optical transceiver subsystem comprises a first array of microLEDs and photodetectors, first microLED driver circuitry to drive microLEDs, of the first array of microLEDs and photodetectors, to emit light in accordance with information from the first IC chip, and first receiver circuitry to process signals received by photodetectors, of the first array of microLEDs and photodetectors, to provide information to the first IC chip, and the plurality of waveguide cores are cores of a multicore fiber. In some such embodiments the multicore fiber is a coherent imaging fiber. In some such embodiments the cores are sufficiently small and closely spaced such that light from each microLED will form a spot spanning multiple cores.

In some embodiments the first optical transceiver subsystem comprises a first array of microLEDs and photodetectors, first microLED driver circuitry to drive microLEDs, of the first array of microLEDs and photodetectors, to emit light in accordance with information from the first IC chip, and first receiver circuitry to process signals received by photodetectors, of the first array of microLEDs and photodetectors, to provide information to the first IC chip, and the plurality of waveguide cores are cores of a multicore fiber, and further comprising a turning mirror optically between the first array of microLEDs and photodetectors and the multicore fiber. Some such embodiments further comprise at least one lens optically between the first array of microLEDs and photodetectors and the multicore fiber.

These and other aspects of the invention are more fully comprehended upon review of this disclosure.

BRIEF DESCRIPTION OF THE FIGURES

FIG. 9a show an optoelectronic (OE) subassembly in accordance with aspects of the invention.

FIG. 9b shows an MW subassembly, in accordance with aspects of the invention.

FIG. 9c shows the use of a turning mirror to turn a light beam by ninety degrees, in accordance with aspects of the invention.

FIG. 9d shows the use of two turning mirrors to turn a light beam by one hundred eighty degrees, in accordance with aspects of the invention.

DETAILED DESCRIPTION

Figure 1:
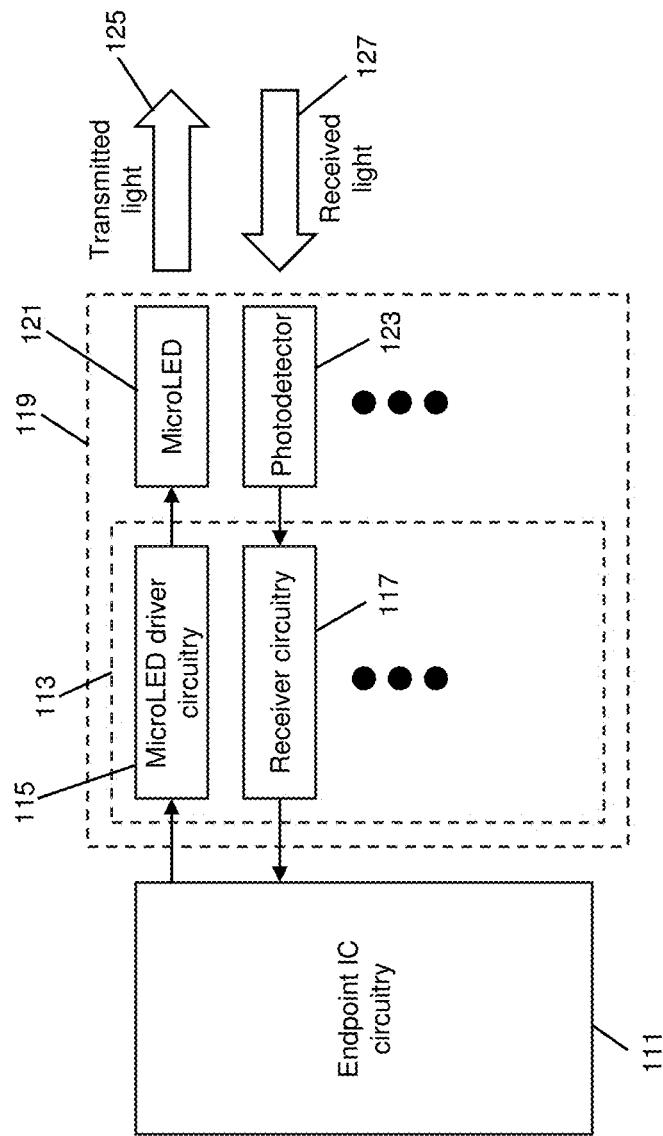
FIG. 1 is a block diagram showing an electrical architecture of a first optically-interconnected IC, in accordance with aspects of the invention.

FIG. 1 is a block diagram showing an electrical architecture including a first optically-interconnected IC. The IC includes IC circuitry 111 for performing logic and/or other functions. Transceiver circuitry 113 is coupled to the IC circuitry. The transceiver circuitry comprises, and in some embodiments consists of, an array of microLED driver circuitry 115 and an array of receiver circuitry 117. The transceiver circuitry is part of a transceiver subsystem 119. The transceiver subsystem also includes an array of microLEDs 121 and photodetectors 123. In some embodiments the transceiver circuitry may be monolithically integrated into the same IC containing the endpoint IC circuitry. In some embodiments the transceiver circuitry or may be contained in one or more separate transceiver ICs. The microLED driver circuitry drives the array of microLEDs to emit light 125 to carry information provided to the driver circuitry from the endpoint IC circuitry. An N-bit wide unidirectional parallel bus connection may be implemented with N optical links from the transceiver subsystem to a second IC (not shown in FIG. 1), or, in some embodiments, a plurality of second ICs. A corresponding unidirectional parallel bus may be implemented by adding N additional optical links from the transceiver subsystem of the second IC to the transceiver subsystem of the first IC. The photodetectors receive light 127 from the corresponding parallel bus, the light carrying information from the second IC. The photodetectors provide electrical signals carrying the received information to the receiver circuitry, which processes the signals and provides the information to the endpoint IC circuitry.

The optoelectronic (OE) devices, for example the microLEDs and photodetectors, may include structures that enhance optical coupling efficiency. For instance, microLEDs may include various structures that improve the light extract efficiency (LEE), including surface roughening, particular LED shapes, and encapsulation in high-index materials. They may also include structures such as mirrors and lenses that collect the light from the LED's large intrinsic emission solid angle into a smaller solid angle that is better matched to the numerical aperture of the rest of the optical link. MicroLEDs are amenable to this reduction of angular cone due to their small size and thus relatively small etendue.

Figure 2A:
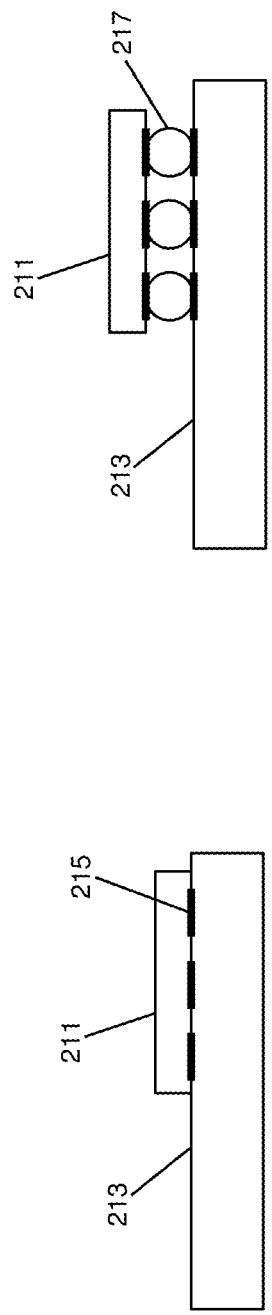
FIG. 2a shows a substrate with optoelectronic (OE) devices coupled to a transceiver IC by way of direct bonds, in accordance with aspects of the invention.
Figure 2B:
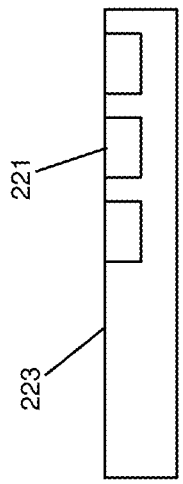
FIG. 2b shows a substrate with OE devices coupled to a transceiver IC by way of solder balls, in accordance with aspects of the invention.
Figure 2C:
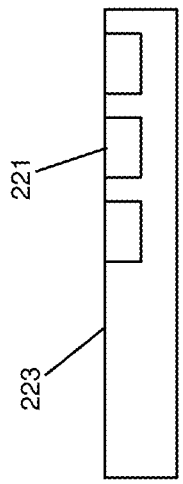
FIG. 2c shows OE devices monolithically integrated into a transceiver IC, in accordance with aspects of the invention.

In some embodiments the OE devices can be integrated with the transceiver IC through hybrid integration techniques. FIG. 2a shows an embodiment in which the hybrid integration technique is direct bonding. In FIG. 2a, a substrate with OE devices 211 is coupled to a transceiver IC 213 by way of direct bonds 215. FIG. 2b shows an embodiment in which the hybrid integration technique is solder bump bonding. In FIG. 2b, the substrate with OE devices 211 is coupled to the transceiver IC 213 by way of solder bumps 217. In some embodiments OE devices 221 can be monolithically integrated into a transceiver IC 223, as illustrated in FIG. 2c. The viability of monolithic integration may be strongly dependent on the IC material and the source wavelength. Silicon generally supports monolithic integration of photodetectors for wavelengths <1 um but may be not viable for monolithic optical source integration because it is an indirect bandgap material. By contrast, GaAs, InP, and GaN support monolithic integration of both photodetectors and optical sources. It is possible to mix monolithic and hybrid integration on a single transceiver IC. For instance, a transceiver IC may include microLEDs that are directly bonded to the IC along with monolithically-integrated photodiodes.

Figure 3A:
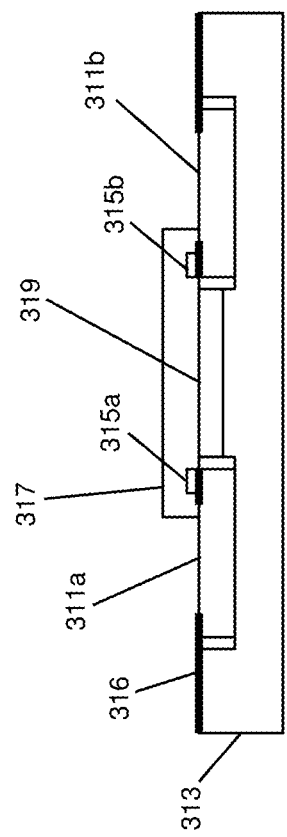
FIGS. 3a-c show different physical configurations for implementing a transceiver subsystem, in accordance with aspects of the invention.
Figure 3B:
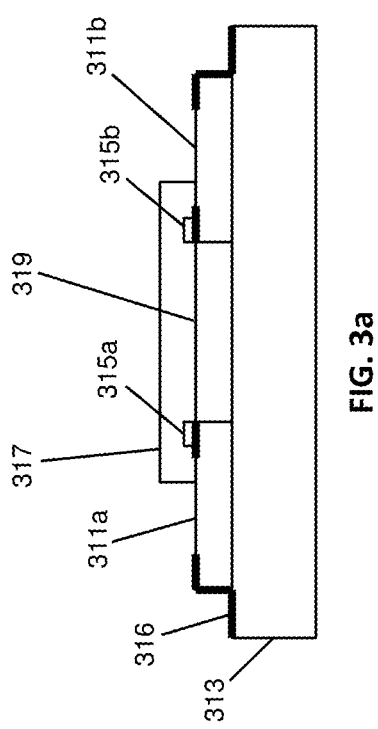
Figure 3C:
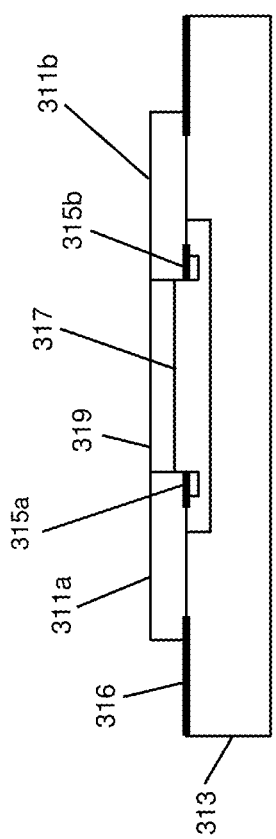

The transceiver subsystem can be implemented in a number of different physical configurations, for example as illustrated in FIGS. 3a-c. The configurations include a substrate, which may be rigid or flexible. Rigid substrate materials include silicon, glass, and laminates that include epoxy or resin. Flexible substrates may be made from various polymers.

In FIG. 3a, a first transceiver IC 311a is mounted to the top of a substrate 313 with an active side facing up. A first OE device 315a is on top of the transceiver IC. The first transceiver IC in some embodiments is a very thin "micro-IC" that is only a few tens of microns thick. Electrical connections from a first endpoint IC (not shown in FIG. 3a) to the first transceiver IC are made by deposited metal traces 316 that traverse the top of the substrate, and the side and top surfaces of the first transceiver IC. The first OE device is shown on the active side of the first transceiver IC. The first OE device receives signals from and/or provides signals to the first transceiver IC. The first OE device is shown as embedded or encapsulated in a waveguide core 317. The waveguide core extends to a second transceiver IC 311b, with waveguide cladding 319 being shown as on top of the substrate between the first and second transceiver ICs. A second OE device 315b is shown as on an active side of the second transceiver IC, with the second OE device also shown as embedded or encapsulated in the waveguide core. The second transceiver IC and the second OE may be as discussed with respect to the first transceiver IC and the first OE. As with the first transceiver IC, the second transceiver IC has electrical connections from a second endpoint IC (not shown in FIG. 3a). The first and second transceiver ICs, OE devices, and waveguide therefore may provide for optical communications substantially between the first endpoint IC and the second endpoint IC.

In FIG. 3b, the transceiver ICs 311a,b are placed in a cavity in the substrate 313. A material may be used to fill any gaps between the ICs and the substrate. This, for example, allows planar electrical connections from the substrate to the ICs. As with FIG. 3a, the OE devices 315a,b are on top of the transceiver ICs.

In FIG. 3c, the transceiver ICs 311a,b are mounted to the substrate 313 with their active sides facing down. Such may simplify electrical connections from the substrate to the transceiver ICs. In FIG. 3c, part of each of the transceiver ICs containing the OE devices 315a,b hangs over a cavity in the substrate. The OE devices are on the bottom of the transceiver ICs, in the cavity in the substrate.

For the embodiments of FIGS. 3a-c, the wave guide cores may be an array of planar optical waveguides, for example comprised of a bottom cladding and an array of cores, each of which guides light from a microLED at one end to a photodetector at the other end. Alternatively, both a microLED and photodetector can be located at both ends of each waveguide. This enables bidirectional transmission through each waveguide, supporting a duplex link.

In the embodiments of FIGS. 3a-c, a waveguide cladding layer is deposited in an appropriate region of the substrate. A layer of waveguides cores is fabricated on top of (or below for FIG. 3c) the cladding layer in a manner such that each OE device is encased in a separate waveguide core.

Figure 4:
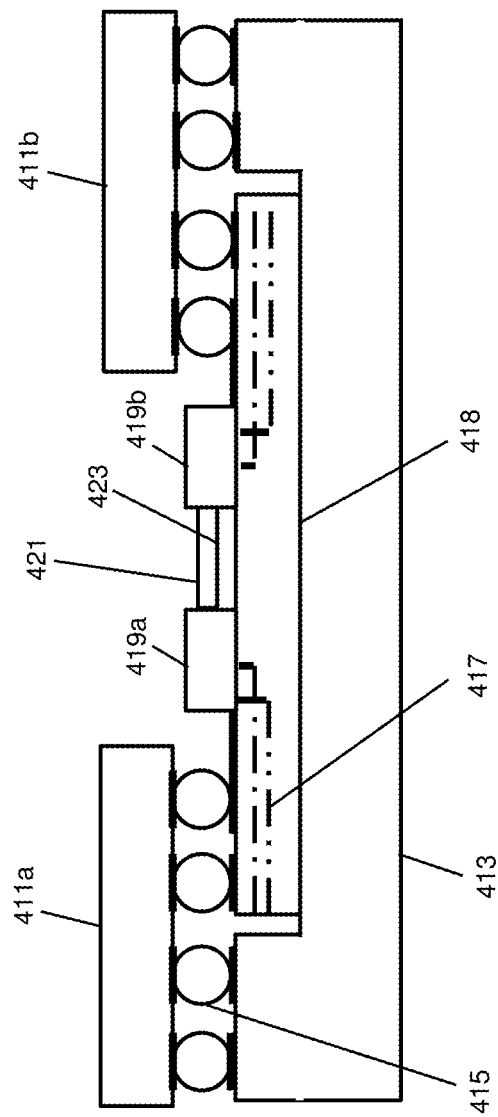
FIG. 4 shows integration of planar optical links within a package, in accordance with aspects of the invention.

FIG. 4 shows integration of planar optical links within a package. A first endpoint IC 411a is mounted to pads on a package 413 by way of solder bumps 415. Some pads connect to traces in metal signal layers 417 of the package (or a substrate 418 of the package), providing connection to a first transceiver subsystem 419a. The first transceiver subsystem may be as discussed previously. One or more waveguide cores 421 couple the first transceiver subsystem to a second transceiver subsystem 419b, which may also be as discussed previously. For example, the waveguide cores may be separated from substrate by waveguide cladding 423. The second transceiver subsystem is connected to a second endpoint IC 411b, also by traces in metal signal layers of the package (or a substrate of the package). In FIG. 4, the metal signal layers of the package do not provide for electrical communications between the first endpoint IC and the second endpoint IC, although in some embodiments such may be additionally provided.

Figure 5:
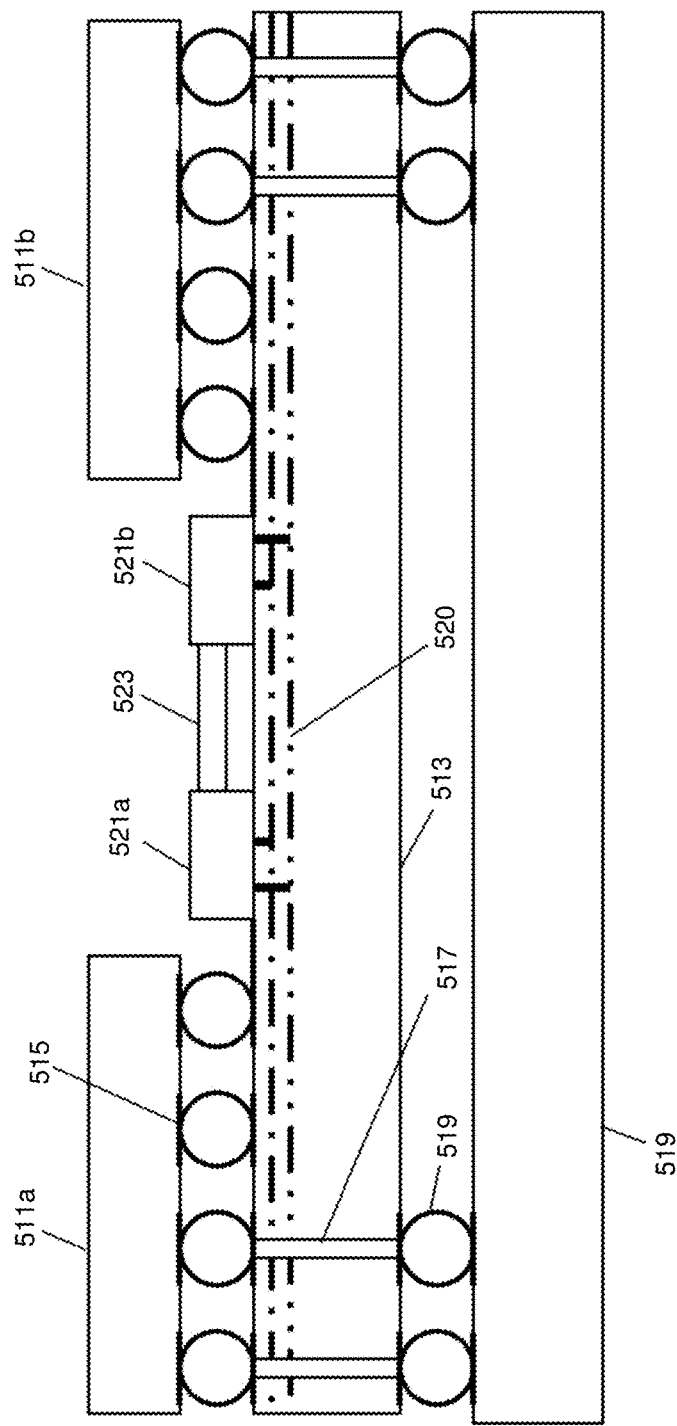
FIG. 5 shows integration of optical links within an interposer and package, in accordance with aspects of the invention.

FIG. 5 shows the integration of planar optical links within an interposer and package. A first endpoint IC 511a is mounted to pads on the interposer 513 with solder bumps 515. Some of the pads connect to through-substrate vias (TSVs) 517 that, in turn, connect to the package 519 via solder bumps. Other pads of the interposer connect to traces in metal signal layers 520 of the interposer providing connection to a first transceiver subsystem 521a. The first transceiver subsystem may be as discussed previously. One or more waveguide cores 523 couple the first transceiver subsystem to a second transceiver subsystem 521b, which may also be as discussed previously. The second transceiver subsystem is connected to a second endpoint IC 511b, also by traces in metal signal layers of the interposer. In FIG. 5, the metal signal layers of the interposer provide for electrical communications between the first endpoint IC and the second endpoint IC, although in some embodiments such is not provided.

FIGS. 2a-c showed examples of optoelectronic devices integrated onto the active side of an IC. In a vertically-launched parallel optical link (VLPOL), a 2D array of OE devices is integrated with the IC. The optoelectronic (OE) devices, comprise, and in some embodiments consist of, a combination of microLEDs and photodetectors.

As discussed above, the OE devices can be monolithically-integrated or hybrid-integrated with the IC. Generally, the viability of monolithic integration depends on the IC material and link wavelength. In the case of heterogeneous integration, die with large arrays of LEDs or photodetectors may be attached to the IC in a single attachment process.

Note that the OE devices may, in general, be located anywhere on the IC surface. This ability to place optical IO anywhere on the IC surface may provide a number of benefits, including: interconnect density that scales with IC area rather than edge length, enabling increased chip-to-chip interconnect density; and ability to place off-chip interconnects very close to associated processing logic, allowing for more flexible optimized IC layout and reducing on-chip interconnect resources.

Figure 6D:
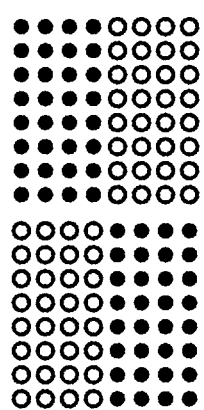
FIGS. 6a-e show various optoelectronic device configurations, in accordance with aspects of the invention.
Figure 6E:
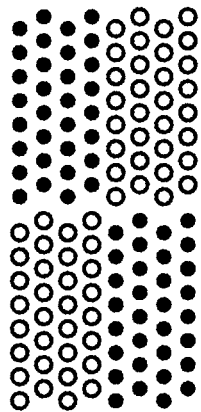
Figure 6B:
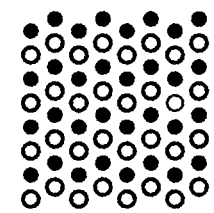
Figure 6A:
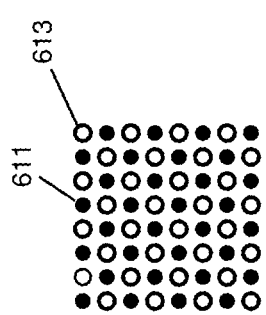

It is frequently desired that the links be bidirectional. In the case of highly parallel bussed optical connections, it may be desirable to have both directions of the link in close physical proximity to each other. This can be accomplished by various optoelectronic device configurations as shown in FIGS. 6a-e. In FIG. 6a, microLEDs 611 and photodetectors 613 are alternated with each other on a rectangular grid. In FIG. 6b the microLEDs and photodetectors are alternated on a hexagonal grid. Both of these configurations have each photodiode close to multiple microLEDs, which can create electrical and optical crosstalk problems. These configurations may also be unattractive from a manufacturing/assembly standpoint because it may be easier to fabricate and assembly monolithic arrays of OE devices.

Figure 6C:
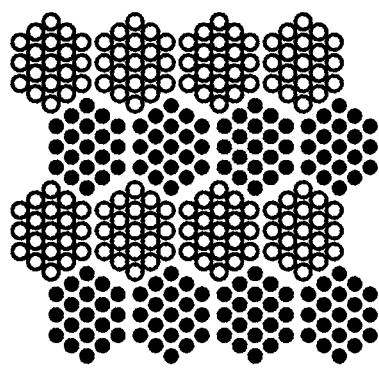

The problems associated with these alternating configurations can be overcome or reduced by "tiling" alternating arrays of microLEDs and photodetectors. FIG. 6c shows hexagonal tiles of microLEDs and photodetectors, with individual devices on a hexagonal grid. FIG. 6d shows rectangular tiles of microLEDs and photodetectors, with individual devices on a rectangular grid. FIG. 6e shows approximately rectangular tiles of microLEDs and photodetectors, with individual devices on a hexagonal grid.

Figure 7C:
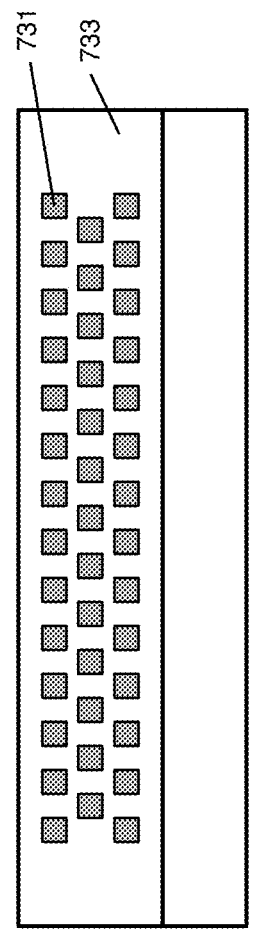
FIG. 7c shows a multi-layer planar waveguide stack, in accordance with aspects of the invention.

The two-dimensional OE device array may be butt-coupled into an array of multicore waveguides. Various types of multicore waveguides may be used. FIG. 7a shows a cross-sectional view of a multicore fiber in which each core may be coupled to one microLED on one end and one photodetector on the other end. The multicore fiber of FIG. 7a includes a plurality of waveguide cores 711, with each core surrounded by cladding 713.

Figure 7B:
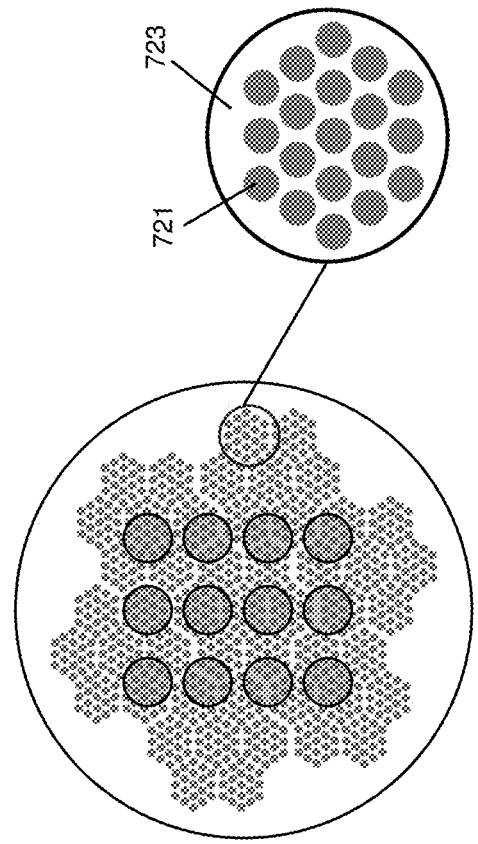
FIG. 7b shows a cross-sectional view of coherent imaging fiber, with an exploded view of a portion of the fiber, in accordance with aspects of the invention.
Figure 7A:
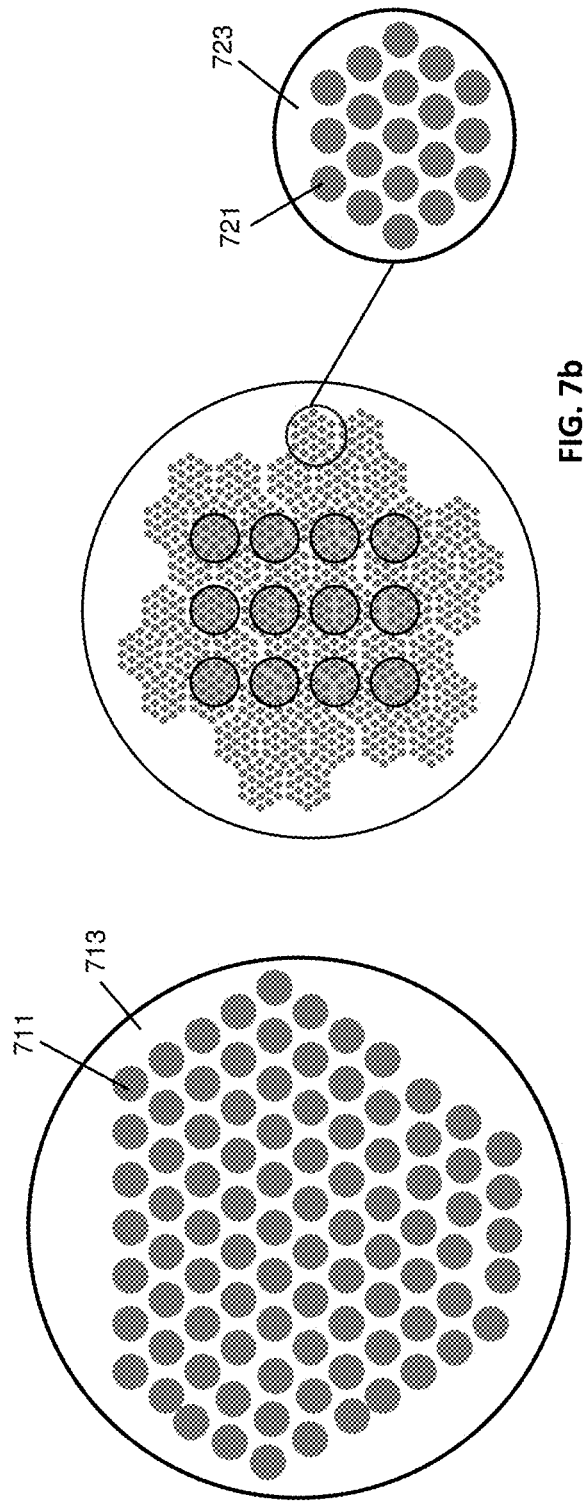
FIG. 7a shows a cross-sectional view of a multicore fiber, in accordance with aspects of the invention.

FIG. 7b shows a cross-sectional view of coherent imaging fiber, with an exploded view of a portion of the fiber. The fiber is comprised of a large number of very small diameter "micro-cores" 721 with the cores surrounded by cladding 723. The term "coherent imaging fiber" refers to the fact that the optical intensity distribution at an input face of the fiber is approximately reproduced at the output face of the fiber. More accurately, the output optical distribution is a spatially sampled version of the input optical distribution, where the spatial sampling frequency is determined by the center-to-center spacing of the micro-cores. In some embodiments the cores are sufficiently small and closely spaced that the light from each microLED forms a spot spanning multiple cores, and multiple cores thus transport the light from each input microLED to each photodetector. Such an arrangement flexibly accommodates various optical configurations (e.g., different numbers of OE devices, different spot sizes from the microLEDs). Differential phase shifts across cores could cause output speckle problems with a spatially coherent input, but the low spatial and temporal coherence associated with a microLED source generally reduces or eliminates speckle problems.

FIG. 7c shows a multi-layer planar waveguide stack. The multi-layer planar waveguide stack includes a plurality of planar layers, with each planar layer including a plurality of waveguide cores 731, surrounded by waveguide cladding 733. Planar waveguides may be commonly used in a single-layer configuration. Multiple layers can be stacked to implement a 2D array of waveguides. The waveguide array may be fabricated on a rigid or flexible planar substrate, but there are significant advantages to the use of flexible substrate, including: for highly interconnected architectures with ICs lying in a plane, many connections may cross over each other; and if we have the freedom to distribute ICs across multiple substrates which may or may not be lying in a plane, the use of flexible waveguides may traverse the third dimension.

Even with high-performance optical links, ICs still generally use many electrical connections for power, ground, and control lines. Therefore, optical links should coexist with electrical packaging. High-performance packaging typically uses solder bumps or direct bonding to create dense connections from an active circuit side of an IC to a substrate with good electrical and thermal characteristics.

Figure 8B:
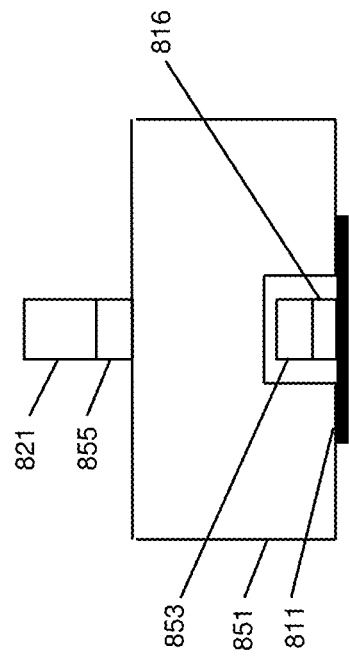
FIG. 8b shows an example of use of a transparent substrate, in accordance with aspects of the invention.
Figure 8A:
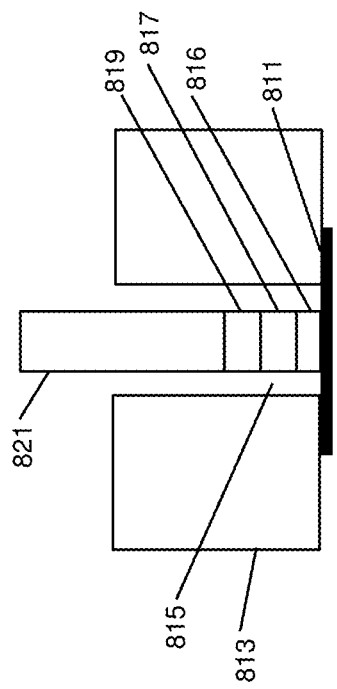
FIG. 8a shows a hole in a substrate that allows an optical connection to traverse to the other side of the substrate, in accordance with aspects of the invention.

It is advantageous to make optical connections from this same active circuit side of the IC. However, this potentially creates problems because the substrate is very close to the IC when using bumps or direct bonding. To allow adequate space for the optical connections, it may be advantageous for the optical connections to traverse the substrate. FIG. 8a shows a hole in a substrate that allows an optical connection to traverse to the other side of the substrate. An optical coupling assembly and a multicore waveguide assembly both fit within the hole. As shown in FIG. 8a, an IC 811 is mounted to a substrate 813. The substrate includes a hole 815, with the hole over a portion of the IC (or under a portion of the IC, depending on orientation). An OE device array 816 is mounted on the IC, within a volume of the hole. An optical coupling assembly 817 is on the OE device array, with a multicore waveguide coupling assembly 819 coupled to the optical coupling assembly. Both the optical coupling assembly and the multicore waveguide coupling assembly are within the hole in the substrate, in the embodiment illustrated in FIG. 8a. A multicore waveguide 821 extends from the multicore waveguide coupling assembly, out through a side of the substrate opposite that of the IC.

The use of a substrate that is transparent at the link's wavelength enables an alternative approach. FIG. 8b shows an example of use of a transparent substrate. In FIG. 8b, the IC 811 is mounted to a transparent substrate 851. The optoelectronic (OE) device array 816 is on the IC and coupled to the multicore waveguide assembly through the substrate by optical coupling assemblies placed on both sides of the substrate, with FIG. 8b showing an optical coupling assembly 853 on the OE device array and a multicore waveguide coupling assembly 855 on an opposing side (from the IC) of the transparent substrate. The multicore waveguide 821 extends from the multicore waveguide coupling assembly and away from the substrate. Some embodiments may include a cavity on the OE side of the substrate to accommodate the optical coupling assembly, for example as shown in FIG. 8b.

An exemplary optical coupling assembly implementation comprises, and in some embodiments consists of, an optoelectronic (OE) subassembly and a multi-waveguide (MW) subassembly. FIG. 9a show an OE subassembly. In the OE subassembly, a lens 911 may be placed approximately one focal length from an OE device array 913. In the example of FIG. 9a, the OE device array is shown mounted to an IC 915 by solder bumps 917. FIG. 9b shows an MW subassembly. In the MW subassembly, a lens 921 may be placed approximately one focal length from a multicore waveguide (MW) array 923. The space between the two lenses can span a relatively large range, allowing its use both of the aforementioned substrate traversal arrangements with a wide variety of different substrate thicknesses. The large tolerance of the space between lenses simplifies assembly and may allow for increases manufacturing yields.

The ability to accommodate a large space between the lenses also allows the insertion of additional optical elements such as turning mirrors. In FIG. 9c, an OE device array 951 is on an IC 953. Light to or from the OE device array passes through a first lens 955. The first lens, and in some embodiments also the OE device array, may be considered an OE coupling assembly 957. A turning mirror 959 reflects, or turns, the light by 90 degrees, to or from a second lens 961. The light passing through the second lens arrives at or comes from a multicore waveguide 963. The second lens, and in some embodiments an end face of the multicore waveguide, may be considered a MW coupling subassembly 965. FIG. 9c shows the use of the turning mirror to turn the beam by 90°. This is a powerful technique for decreasing the size of systems using vertically launched parallel optical links (VLPOLs). As shown in FIG. 9d, two turning mirrors 959a,b can be used inserted between the first and second lenses 955, 961 to turn light 180°, which can be useful in various circumstances, for example if a direction of emission orientation of a microLED is opposite that of a desired signal path or a variety of other circumstances.

Although the invention has been discussed with respect to various embodiments, it should be recognized that the invention comprises the novel and non-obvious claims supported by this disclosure.

What is claimed is:

1. Optically interconnected integrated circuits, comprising:
    a substrate;
    a first integrated circuit (IC) chip, including logic circuitry, mounted to the substrate;
    a first optical transceiver subsystem mounted to the substrate, the first optical transceiver subsystem comprising a first array of microLEDs and photodetectors, first microLED driver circuitry to drive microLEDs, of the first array of microLEDs and photodetectors, to emit light in accordance with information from the first IC chip, and first receiver circuitry to process signals received by photodetectors, of the first array of microLEDs and photodetectors, to provide information to the first IC chip, wherein the first microLED driver circuitry and the first receiver circuitry are in a first transceiver IC chip mounted to the substrate and wherein the microLEDs, of the first array of microLEDs and photodetectors, are bonded to the first transceiver IC chip;
    a second IC chip, including logic circuitry, mounted to the substrate;
    a second optical transceiver subsystem mounted to the substrate, the second optical transceiver subsystem comprising a second array of microLEDs and photodetectors, second microLED driver circuitry to drive microLEDs, of the second array of microLEDs and photodetectors, to emit light in accordance with information from the second IC chip, and second receiver circuitry to process signals received by photodetectors, of the second array of microLEDs and photodetectors, to provide information to the second IC chip, wherein the second microLED driver circuitry and the second receiver circuitry are in a second transceiver IC chip mounted to the substrate and wherein the microLEDs, of the second array of microLEDs and photodetectors, are bonded to the second transceiver IC chip;
    the substrate including metal signal layers connecting the first IC chip and the first optical transceiver subsystem, and connecting the second IC chip and the second optical transceiver subsystem; and
    a plurality of waveguide cores optically connecting the first optical transceiver subsystem and the second optical transceiver subsystem, the plurality of waveguide cores being cores of a multicore fiber, with each core surrounded by cladding, the multicore fiber being a coherent imaging fiber, which provides an output optical distribution that is a spatially sampled reproduction of an input optical distribution;
    wherein the substrate is in a package.

2. The optically interconnected integrated circuits of claim 1, wherein the substrate includes metal signal layers connecting the first IC chip and the second IC chip.

3. The optically interconnected integrated circuits of claim 1, wherein the substrate does not include metal signal layers connecting the first IC chip and the second IC chip.

4. The optically interconnected integrated circuits of claim 1, wherein the substrate is coupled to the package by solder balls.

5. The optically interconnected integrated circuits of claim 4, wherein the substrate includes first through-substrate vias connecting at least some of the solder balls coupling the substrate and package with the first IC chip.

6. The optically interconnected integrated circuits of claim 5, wherein the substrate includes second through-substrate vias connecting at least some other of the solder balls coupling the substrate and package with the second IC chip.

7. The optically interconnected integrated circuits of claim 1, wherein the first microLED driver circuitry comprises a first array of microLED driver circuitry and the first receiver circuitry comprises a first array of receiver circuitry.

8. The optically interconnected integrated circuits of claim 1, wherein the photodetectors, of the first array of microLEDs and photodetectors, are monolithically integrated in the first transceiver IC chip.

9. The optically interconnected integrated circuits of claim 1, wherein the first array of microLEDs and photodetectors are arranged in tiles.

10. The optically interconnected integrated circuits of claim 7, wherein the second microLED driver circuitry comprises a second array of microLED driver circuitry and the second receiver circuitry comprises a second array of receiver circuitry.

11. The optically interconnected integrated circuits of claim 1, wherein the photodetectors, of the second array of microLEDs and photodetectors, are monolithically integrated in the second transceiver IC chip.

12. The optically interconnected integrated circuits of claim 1, wherein the second array of microLEDs and photodetectors are arranged in tiles.

13. The optically interconnected integrated circuits of claim 1, wherein the cores are sufficiently small and closely spaced such that light from each microLED will form a spot spanning multiple cores.

14. The optically interconnected integrated circuits of claim 1, further comprising a turning mirror optically between the first array of microLEDs and photodetectors and the multicore fiber.

15. The optically interconnected integrated circuits of claim 14, further comprising at least one lens optically between the first array of microLEDs and photodetectors and the multicore fiber.

\* \* \* \* \*